United States Patent [19]

Emter

[11] Patent Number: 5,088,358
[45] Date of Patent: Feb. 18, 1992

[54] AUTOMATIC DUAL-SIDE SAW BLADE GRINDER HAVING COMMON BLADE ADVANCEMENT AND CLAMP ACTUATOR AND METHOD OF USING SAME

[76] Inventor: James Emter, 23429 NE. 29th Ave., Ridgefield, Wash. 98642

[21] Appl. No.: 664,088

[22] Filed: Mar. 4, 1991

[51] Int. Cl.$^5$ ............................................. B23D 63/14
[52] U.S. Cl. .......................................... 76/75; 76/41; 76/112
[58] Field of Search ................... 76/37, 40, 41, 42, 43, 76/75, 76, 78.1, 79, 112

[56] References Cited

U.S. PATENT DOCUMENTS

| 4,102,224 | 7/1978 | Wright | 76/79 |
| 4,750,387 | 6/1988 | Swiger | 76/37 |
| 4,823,649 | 4/1989 | Emter | 76/41 |
| 4,846,023 | 7/1989 | Emter | 76/41 |
| 4,901,604 | 2/1990 | Emter | 76/41 |

FOREIGN PATENT DOCUMENTS 2717111 10/1978 Fed. Rep. of Germany .......... 76/37

Primary Examiner—Roscoe V. Parker
Attorney, Agent, or Firm—Chernoff, Vilhauer, McClung & Stenzel

[57] ABSTRACT

An automatic dual-side saw blade grinding machine includes a common actuator to advance the saw blade to place subsequent teeth in position for grinding and to clamp the saw blade to prevent side-by-side movement during grinding. Thus, no adjustment is required to synchronize the timing between blade rotation and clamping. The actuator is a double-acting two-sided pneumatic piston cylinder which has one end attached directly to the clamping mechanism and the other end attached to the spindle that carries the saw blade through a push-pull cable and a linkage that converts linear motion to rotary motion. The linkage is adjustable to accommodate saw blades having different tooth spacing. The piston cylinder is actuated by an air valve that is cycled by a cam driven by the motor that cycles the blade grinding wheels. Accordingly, machine speed can be changed simply by changing the motor speed.

13 Claims, 3 Drawing Sheets

AUTOMATIC DUAL-SIDE SAW BLADE GRINDER HAVING COMMON BLADE ADVANCEMENT AND CLAMP ACTUATOR AND METHOD OF USING SAME

BACKGROUND AND SUMMARY OF THE INVENTION

This invention relates to a machine for sharpening circular saw blades, and in particular to such a machine that simultaneously sharpens both sides of the saw blade.

Emter U.S. Pat. No. 4,823,649, Emter U.S. Pat. No. 4,846,023 and Emter U.S. Pat. No. 4,901,604 all disclose saw blade grinders which automatically advance a multiple-tooth circular saw blade one tooth at a time, index each tooth relative to a pair of side grinding wheels, clamp the blade against side-to-side movement and then sharpen the tooth. In these machines advancing and clamping are accomplished with pneumatic piston cylinders. Because of air flow dynamics, the speed at which pneumatic piston cylinders operate varies over time. Thus, individual flow control valves must be provided to achieve the proper timing between the clamping cylinder and the blade rotation cylinder. These flow control valves must constantly be adjusted to maintain the timing, which complicates operation of the machine and necessitates utilizing an operator with a higher skill level than otherwise would be required. The timing problems are made worse by the fact that blade sharpening machines operate at different speeds, depending on saw size, tip material and sharpening requirements. Each time machine speed is changed the pneumatic cylinder flow valves must be readjusted to obtain correct timing between saw blade rotation and clamping, which reduces productivity.

The subject invention overcomes the foregoing shortcomings and limitations of prior automatic dual side saw grinders by utilizing the same actuator for advancing the saw blade and for operating the blade clamping mechanism. Having only one piston cylinder eliminates timing problems and thus the need for flow control valves. In a preferred embodiment, this is accomplished with a double acting two-ended pneumatic piston cylinder. The piston cylinder is mounted similar to the clamping cylinder in the prior art machines with one side of the clamping mechanism being attached to the piston at one end of the piston cylinder. The other end of the piston cylinder engages a push-pull cable that is attached to a rocker bar/crankshaft linkage that converts the linear movement of the cable into rotational movement of the spindle that carries the saw blade. The linkage is adjustable to vary the crankshaft stroke in order to accommodate saw blades with different tooth spacing. The saw blade is coupled to the spindle through a magnetic clutch which permits the piston cylinder to be operated when the saw blade is restrained against rotation.

In operation, a tooth on the saw blade is advanced to the grinding position by moving the piston cylinder in the direction that causes the cable to be extended. This simultaneously releases the clamping mechanism so that the blade is free to rotate. The linkage and cable are arranged so that extension of the piston cylinder advances the blade farther than is necessary, and the tooth is placed in the proper position by moving the piston cylinder in the opposite direction until the tooth contacts an indexing stop. The piston cylinder continues to move in the opposite direction until the clamp is reengaged and the grinding operation is then performed. The foregoing sequence is repeated after each tooth is sharpened until sharpening of the blade is completed.

Operation of the piston cylinder is accomplished by an air valve that is located in the piston cylinder pneumatic lines. The air valve is actuated through a cam that is operated by the motor that advances the grinding wheels. Thus, blade advancement, clamping and grinding are synchronized and are automatically sequenced.

Accordingly, it is a primary object of the subject invention to provide an automatic dual side saw blade grinder in which the saw blade advancement mechanism and clamping mechanism are actuated through a common actuator.

It is a further object of the subject invention to provide such a grinder which is fully automatic and requires no timing adjustment to synchronize the advancement and clamping mechanisms.

It is a still further object of the subject invention to provide such a grinder in which the operating speed of the grinder can be altered without upsetting this synchronization.

It is a yet further object of the subject invention to provide a method for automatic dual side grinding of saw blades without the necessity of adjusting the relative timing of the blade advancement and clamping mechanisms.

The foregoing and other objectives, features and advantages of the present invention will be more readily understood upon consideration of the following detailed description of the invention taken in conjunction with the accompanying drawings.

DETAILED DESCRIPTION OF A PREFERRED EMBODIMENT

Figure 1:
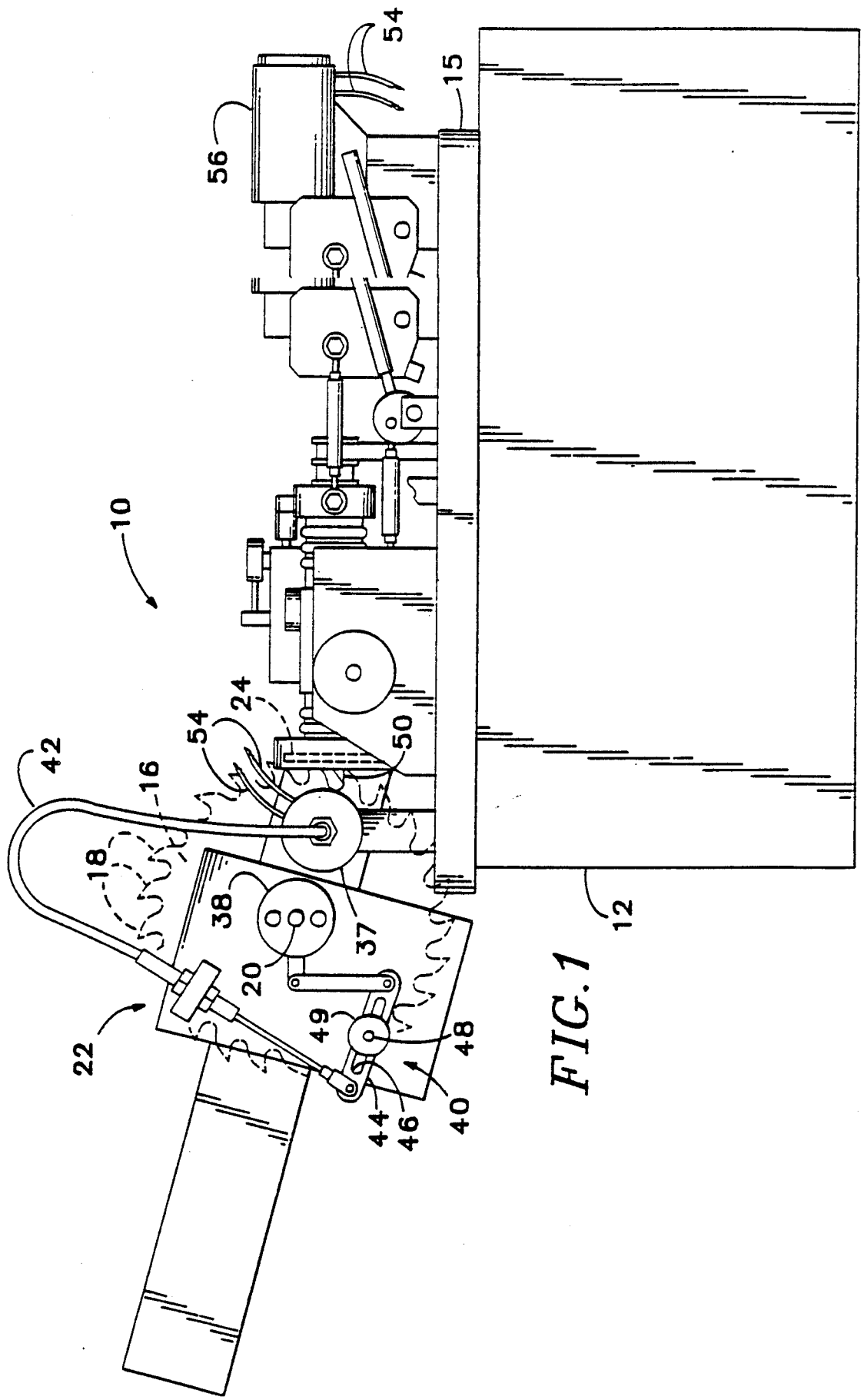
FIG. 1 is side elevation view of a saw grinding machine embodying the features of the subject invention.
Figure 2:
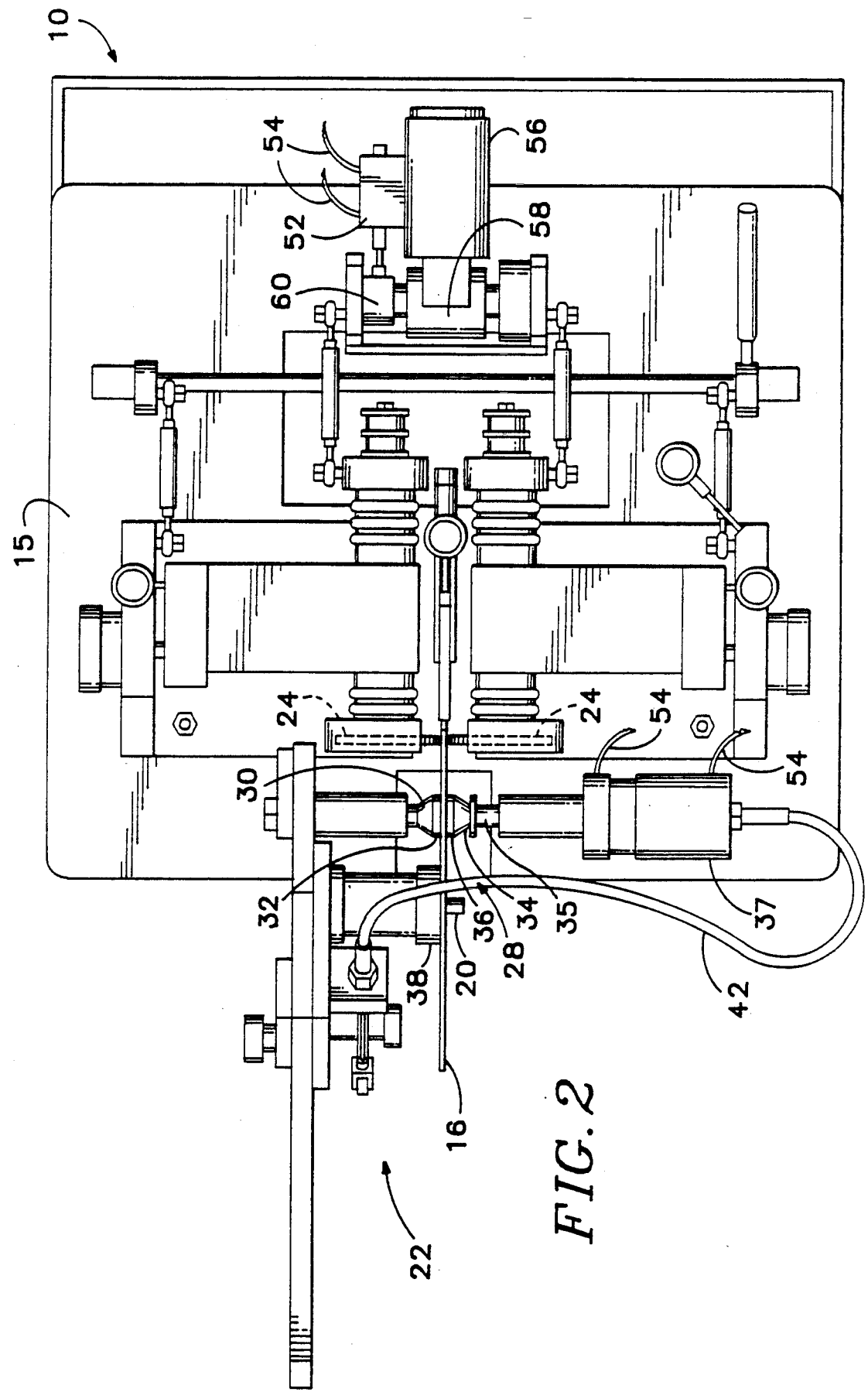
FIG. 2 is a plan view of the saw grinding machine of FIG. 1.

Referring to FIGS. 1 and 2 of the drawings, an automatic dual side grinding machine 1? includes a frame 12 having a horizontal plate 15 that serves as the base for the operative elements of the machine. A saw blade 16, having a plurality of teeth 18, is supported in the machine in a vertical orientation for sharpening. Successive teeth 18 on the saw blade are presented and indexed for grinding by a blade carriage 22, which will be more fully explained later. The teeth 18 are sharpened by a pair of diamond grinding wheels 24 that are driven by a pair of motors (not shown). The grinding mechanism is similar to that disclosed in Emter, U.S. Pat. No. 4,901,604, which is incorporated herein by reference.

The saw blade is clamped by a clamping mechanism 28 during grinding to prevent side-to-side movement.

The clamping mechanism includes a fixed pad 30 having a face 32 that rests against one side of the saw blade 16 when the saw blade is mounted on the spindle 20. A movable pad 34, located across the saw blade from the fixed pad, has a face 36 that opposes the face 32. The movable pad is mounted on the piston 35 at one end of a double-acting, two-ended linear actuator, such as pneumatic piston cylinder 37.

The blade carriage 22 includes a magnetic chuck 38 that is attached to the spindle 20 adjacent to the saw blade 16. The magnetic attraction between the chuck and the saw blade causes the saw blade to rotate with the spindle when the blade is not restrained, but permits the spindle to rotate without the blade when the blade is restrained. The spindle, and thus the saw blade, is rotated after each tooth 18 is sharpened to advance the next unsharpened tooth to the proper position for grinding.

Figure 3:
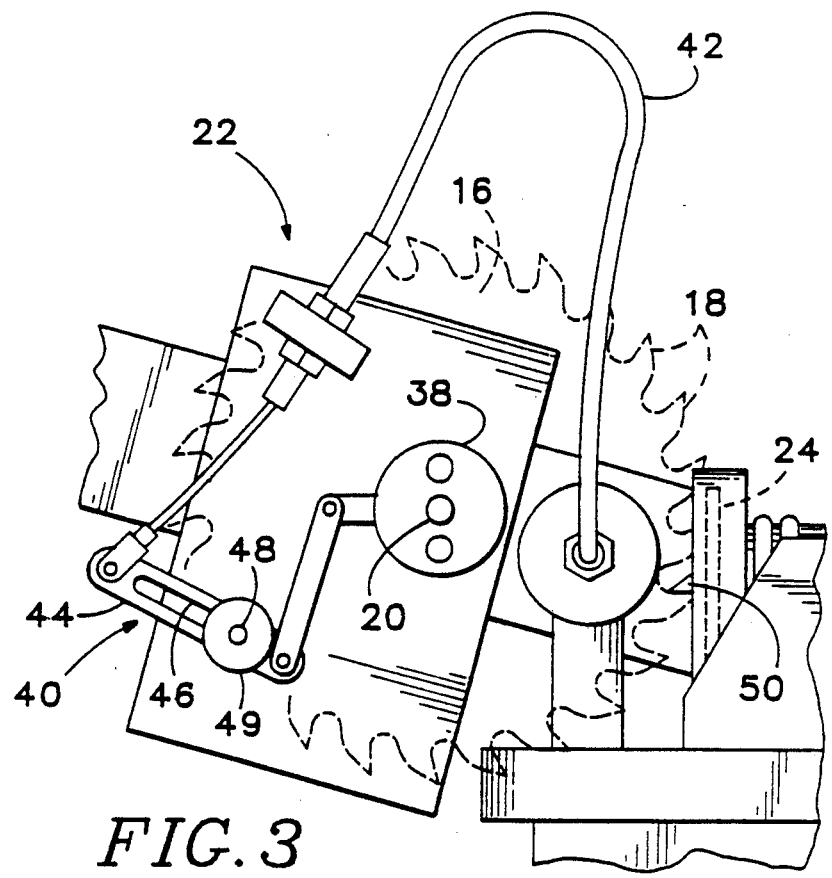
FIG. 3 is a fragmentary side elevation view, at an enlarged scale, showing the blade advancement apparatus of the machine adjusted to accommodate a saw blade with minimum tooth spacing, with the saw blade shown in phantom line.
Figure 4:
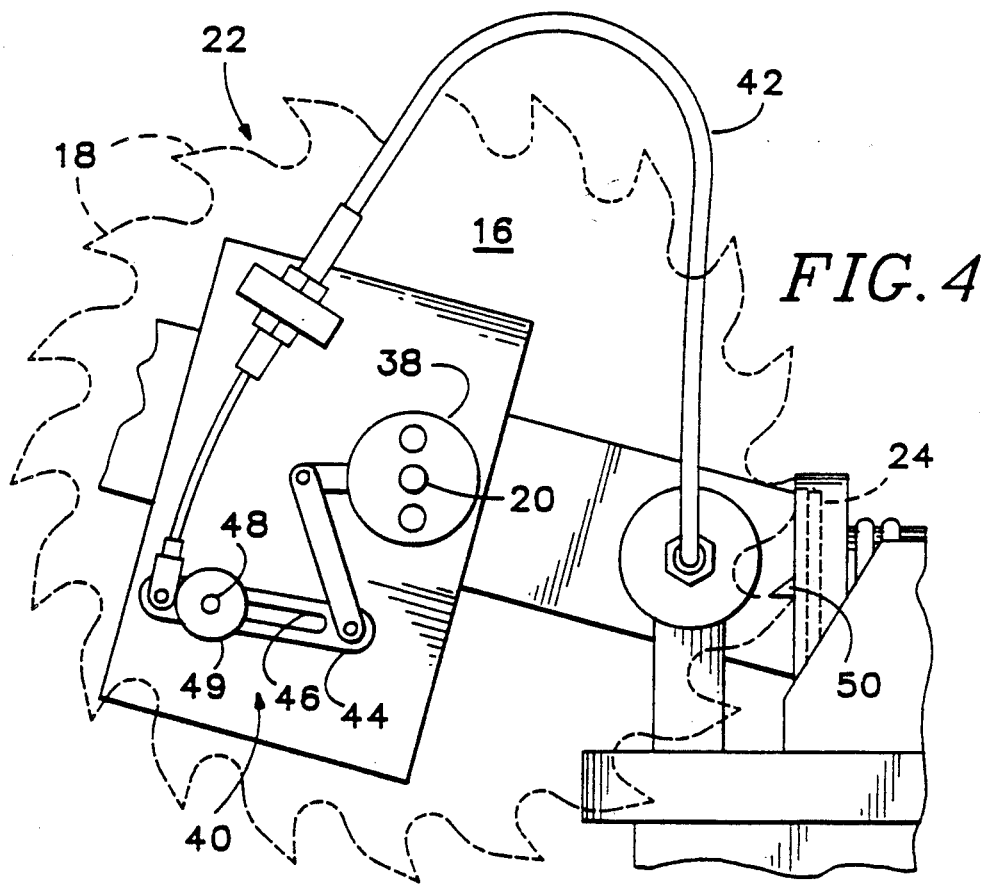
FIG. 4 is a fragmentary side elevation view, similar to FIG. 3, with the blade advancement mechanism adjusted to accommodate a blade with maximum tooth spacing.

The spindle is rotated through a rocker bar/crankshaft linkage 40 that is activated by a push-pull cable 42 that is attached to the end of the pneumatic piston cylinder 37 opposite the piston 35. The rocker link 44 of the linkage 40 includes a central slot 46 that receives the pin 48 that the linkage rotates about. A releasable rotary clamp 49 permits the pin 48 to be placed anywhere along the extent of the slot, in order to accommodate saw blades having different tooth spacings. If the pin 48 is at the inner end of the slot 44, FIG. 3, extension of the cable 42 will cause a relatively small amount of rotation of the saw blade, and if the pin 48 is at the outer end of the slot 46, FIG. 4, the same amount of cable extension will cause a considerably greater rotation of the saw blade. Middle pin placements cause proportionately intermediate degrees of rotation.

The cable 42 and linkage 40 are arranged such that extension of the cable causes the saw blade to rotate over a greater arc than the arc defined by adjacent tooth center lines. As a tooth nears the end of its movement it deflects and passes under a stop 50. The stop 50, which is biased to return to the position shown in the drawings by a spring (not shown), extends behind the tooth after the tooth has moved past it. Retraction of the cable 42 then rotates the saw blade back until the tooth contacts the stop. Further retraction of the cable is accommodated by slippage between the magnetic clutch 38 and the saw blade without further rotation of the saw blade. The stop 50 is positioned to place the tooth at the proper location relative to the grinder wheels 24.

The piston cylinder 37 is actuated by an air valve 52 through lines 54. The air valve is cycled in synchronization with the blade grinding mechanism by the motor 56 that is used to advance the grinding wheels 24. The motor 56 actuates the air valve 52 through a gear box 58 and a cam 60.

Since both the clamping mechanism 28 and the blade carriage 22 are operated by the same piston cylinder, timing problems due to pneumatic flow dynamics no longer exist. Thus, flow control valves do not have to be provided, and the operating speed of the machine can be changed merely by varying the speed of the motor 56.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A side grinder for sharpening the teeth of a circular saw blade comprising:
   (a) means for rotating the saw blade to advance a tooth to a grinding position;
   (b) means for clamping the saw blade, subsequent to rotation thereof, for preventing side-to-side movement of the saw blade during grinding;
   (c) wherein said means for rotating and said means for clamping comprise a single linear actuator.

2. The side grinder of claim 1 wherein said means for clamping comprises a fixed pad having a face that abuts said saw blade on a first side thereof and a movable pad having a face that abuts said saw blade on a second side thereof.

3. The side grinder of claim 1 wherein said linear actuator is a double-acting, double-ended piston cylinder having a piston at one end that moves said movable pad toward and away from the saw blade and a cable assembly that rotates the saw blade at the other end.

4. The side grinder of claim 3, including a linkage interposed between said cable and said means for rotating the saw blade to convert the linear motion of said cable to rotary motion of said saw blade.

5. The side grinder of claim 4 wherein said cable is extended when said movable pad is moved away from the saw blade and retracted when said movable pad is moved toward the saw blade, and said linkage causes the saw blade to be advanced when the cable is being extended.

6. The side grinder of claim 4 wherein said linkage includes means for adjusting the amount that the saw blade is rotated when the cable is extended, to accommodate blades with different tooth spacing.

7. The side grinder of claim 5, including a stop which engages a tooth of the saw blade when said tooth is in the proper position for grinding, and prevents the saw blade from thereafter rotating in the reverse direction.

8. The grinder of claim 7 wherein said means for rotating the saw blade includes clutch means for permitting the cable to be retracted when a saw blade tooth is engaged by said stop.

9. A method for grinding the teeth of a multiple tooth circular saw blade comprising:
   (a) moving a linear actuator in a first direction to simultaneously release a clamp that prevents side-by-side movement of the saw blade during grinding and rotate the saw blade so that an unsharpened tooth thereon is moved toward a grinding wheel;
   (b) thereafter moving said linear actuator in the opposite direction to simultaneously retard the saw blade until said unsharpened tooth is seated against a stop in a grinding position, and activate said clamp;
   (c) grinding said unsharpened tooth; and
   (d) repeating steps (a) through (c) until all of the teeth on the saw blade are sharpened.

10. A side grinder for sharpening the teeth of a circular saw blade comprising:
   (a) a double-acting, two-ended linear actuator;
   (b) a clamp that releaseably engages the saw blade to prevent side-by-side movement thereof during grinding;
   (c) said clamp being operably associated with one end of said linear actuator such that operating said actuator in a first direction causes said clamp to engage the saw blade, and operating the actuator in a second direction causes said clamp to be released from the saw blade; and (d) a linkage operably associated with the other end of said linear actuator such that operating said actuator in said second direction causes the saw blade to be rotated so that an unsharpened tooth is advanced to a grinding position.

11. The side grinder of claim 10, including a clutch interposed between said linkage and the saw blade to permit the saw blade to be rotatably restrained while said actuator is being operated in said first direction.

12. The side grinder of claim 11 wherein said clutch comprises a magnet that rotates with said linkage and magnetically engages the saw blade.

13. The side grinder of claim 10, including a push-pull cable that interconnects said other end of said linear actuator and said linkage.

* * * * *

UNITED STATES PATENT AND TRADEMARK OFFICE
CERTIFICATE OF CORRECTION

PATENT NO. : 5,088,358

DATED : February 18, 1992

INVENTOR(S) : James Emter

It is certified that error appears in the above-identified patent and that said Letters Patent is hereby corrected as shown below:

Column 2, Line 55: delete "1?" insert --10--

Signed and Sealed this

Seventh Day of December, 1993

Attest:

BRUCE LEHMAN

Attesting Officer

Commissioner of Patents and Trademarks